US009061461B1

(12) United States Patent
Vazquez

(10) Patent No.: US 9,061,461 B1
(45) Date of Patent: Jun. 23, 2015

(54) STATIONERY EMBOSSING SYSTEM

(71) Applicant: The New Studio, LLC, Wayzata, MN (US)

(72) Inventor: Pamela Vazquez, Wayzata, MN (US)

(73) Assignee: The New Studio, LLC, Wayzata, MN (US)

( * ) Notice: Subject to any disclaimer, the term of this patent is extended or adjusted under 35 U.S.C. 154(b) by 0 days.

(21) Appl. No.: 13/838,938

(22) Filed: Mar. 15, 2013

(51) Int. Cl.
*D21F 11/00* (2006.01)
*B29C 59/02* (2006.01)

(52) U.S. Cl.
CPC .................................... *B29C 59/02* (2013.01)

(58) Field of Classification Search
USPC ................................ 162/116; 101/26, 28, 3.1
See application file for complete search history.

(56) References Cited

U.S. PATENT DOCUMENTS

| | | | |
|---|---|---|---|
| 7,284,478 | B2 | 10/2007 | Lee |
| 2011/0030568 | A1 | 2/2011 | Tsai |
| 2012/0192733 | A1 | 8/2012 | Angevine |

*Primary Examiner* — Mark Halpern
(74) *Attorney, Agent, or Firm* — Christensen Fonder P.A.

(57) ABSTRACT

A personalized embossing system for embossing a variety of articles, such as cards and stationery. The system includes male and female embossing molds are coupled to opposing attachment surfaces of an embossing workbook. An alignment process can be implemented that self aligns the male and female molds. Coupling of the molds to the attachment surfaces can be accomplished magnetically, with hook-and-loop fabric, or with re-adhereable adhesives. Use of such attachment means enables arbitrary placement and orientation of the molds relative to the embossed article.

15 Claims, 8 Drawing Sheets

STATIONERY EMBOSSING SYSTEM

FIELD OF THE INVENTION

The disclosed invention relates generally to embossing systems, and more particularly to stationery embossing systems.

BACKGROUND OF THE INVENTION

Single image embossing systems for stationery and the like are known. U.S. Pat. No. 7,284,478 to Lee ("Lee"), for example, discloses an embossing system comprising two carriers between which a male and a female mold are disposed. The molds span the width of the carriers, thereby limiting the position and the orientation of the embossed image on the embossed article. The device of Lee is also adapted to be run through a roller pressing device.

An embossing system that is adaptable for custom or personalized embossing of images on a variety of articles and at any location and orientation on the embossed article would be welcomed.

SUMMARY OF THE INVENTION

In various embodiments of the invention, an embossing/recessing system is disclosed that is adapted to emboss images on a variety of articles and in a variety of locations and orientations. The system is suited particularly suited for personalized embossing of limited batch articles such as holiday cards, invitations, business cards, photo albums, scrap books and finished letters on stationery generally.

In one embodiment, an embossing/recessing workbook including two panels hingeably connected together includes attachment surfaces on opposing internal faces of the workbook. One or more mold pairs are mounted and aligned with each other at any location on the attachment faces. The embossing can be accomplished by a hand rolling operation that exerts a pressing force on the mold pairs with the article captured therebetween.

In one embodiment, the molds are attached to the attachment surfaces using a magnetic coupling arrangement. The magnetic coupling enables essentially infinite resolution with respect to the placement and the orientation of the molds. Other attachment means can be utilized as well, including hook-an-loop fabric and re-adhereable adhesives, which also enable arbitrary positioning and orientation of the embossing molds.

The system is self aligning. A first of the male or female molds is initially placed on a first of the attachment surfaces. The second of the female or male molds is then coupled to the first mold. The molds are self aligning because of their three-dimensional complementary shapes. The second of the attachment surfaces is then brought into contact with the second of the molds for capture on the second attachment surface. The molds are thereby aligned for subsequent closing or actuation of the embossing workbook.

The system can also implement a coloring mask for coloring of the embossed image, as well as a hand roller for applying the pressing force.

DETAILED DESCRIPTION OF THE DRAWINGS

Figure 1:
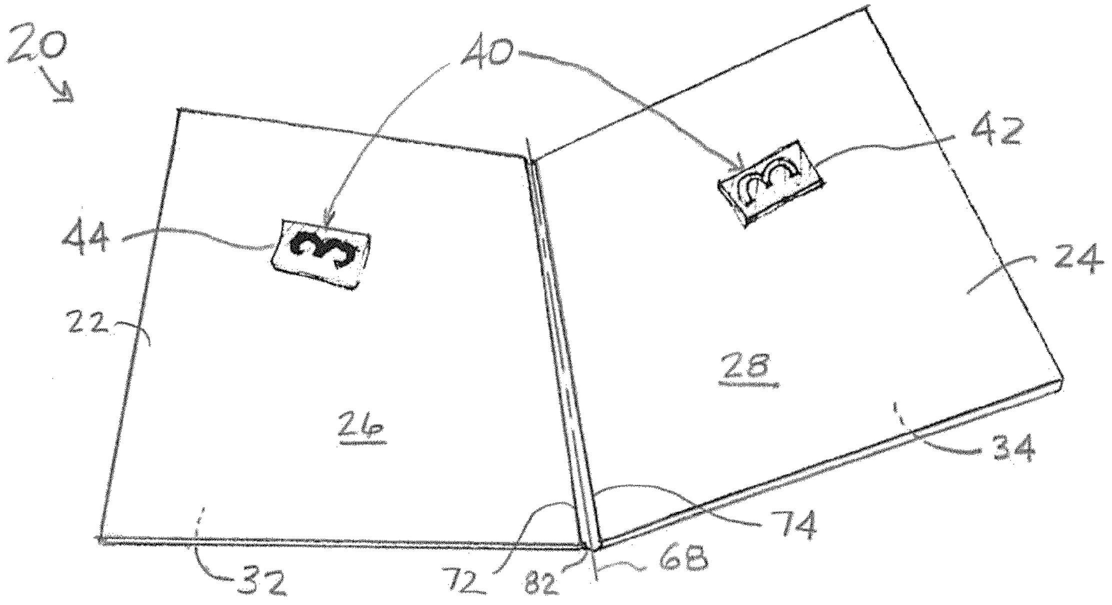
FIG. 1 is a perspective view of a stationery embossing system in an embodiment of the invention.
Figure 2:
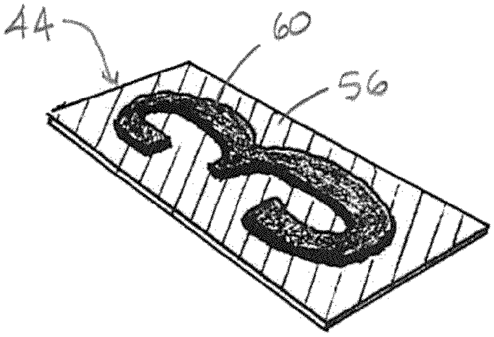
FIGS. 2 and 3 are perspective views of a male embossing mold in an embodiment of the invention.
Figure 3:
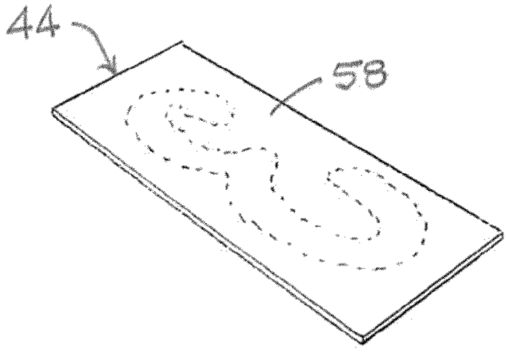
Figure 4:
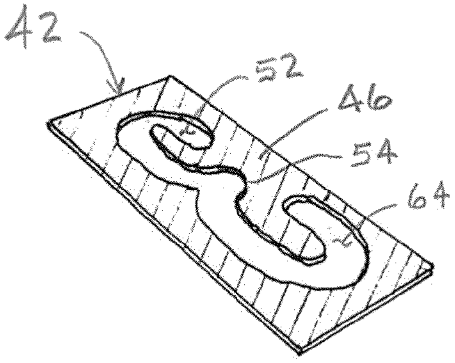
FIGS. 4 and 5 are perspective views of a female embossing mold in an embodiment of the invention.
Figure 5:
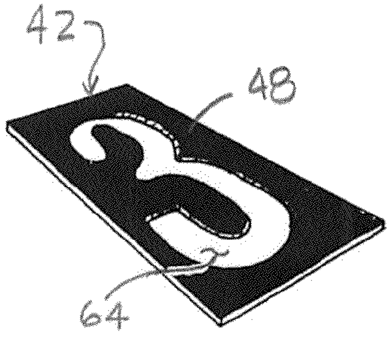

Referring to FIGS. 1 through 5, a stationery embossing system 20 is depicted in an embodiment of the invention. The stationery embossing system 20 includes a first panel 22 and a second panel 24, each panel 22, 24 including a respective attachment surface 26, 28 and a respective backside surface 32, 34. The stationery embossing system 20 further comprises at least one embossing mold pair 40 that includes a female embossing mold 42 and a male embossing mold 44. The female embossing mold 42 includes a front face 46 and a back face 48 and defines a recess 52 relative to the front face 46. The recess 52 further defines a pattern 54 that is to be embossed. The male embossing mold 44 includes a front face 56 and a back face 58, the front face including a raised portion 60 that defines a shape 62 that is complementary to the recess 52 of the female embossing mold 42 of the embossing mold pair 40.

The embossing mold pair can be of any shape and design amenable to embossing, such as, but not limited to, an alpha numeric character in a given font. Moreover, a plurality of embossing mold pairs 40 can be utilized at once, providing a combination of embossed images (e.g., initials of a name, common shapes such as a stars and crescent moon, or other combinations).

The panels 22, 24 can be fabricated from a hard cardboard, a clear plastic or glass, or a metal. Example materials for the embossing mold pair 40 includes cardboard, rigid foams, plastic, metal, magnetized materials and magnetic materials. The embossing molds 42 and 40 can also include a coating on the front faces 46, 56 such as paint, enamel or polymers to help prevent the molds 42, 44 from sticking to the embossed article or to each other during the alignment process.

In one embodiment, the recess 52 of the female embossing mold 42 defines an aperture 64 that passes through the female embossing mold 42 (as depicted). In other embodiments, the recess 52 forms a cavity (not depicted) relative to the front face 46 of the female embossing mold 42. In still other embodiments, the recess 52 defines a combination cavity and aperture (not depicted).

The back faces 48, 58 of the female and male embossing molds 42 and 44 are configured for coupling with a respective one or both of the attachment surfaces 26, 28. The attachment surfaces 26, 18 and back faces 48, 58 are configured so that the respective male and female embossing molds 44 and 42 can be coupled thereto at arbitrary locations and in arbitrary orientations with infinite resolution. That is, the location and orientation of the embossing molds 42, 44 is selected by and subject to the discretion of the user. In one embodiment, the first and second panels 22 and 24 are pivotally connected about a binding axis 68 that extends substantially between parallel edges 72 and 74 of the first and second panels 22 and 24, respectively.

Figure 6A:
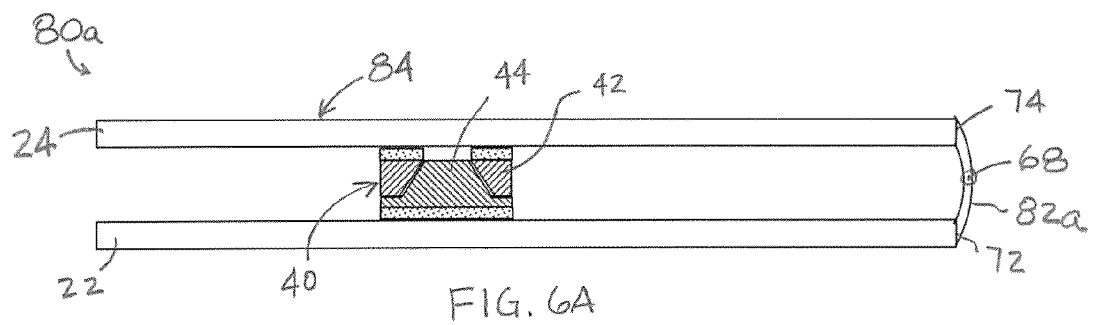
FIGS. 6A through 6C are end views of embossing workbooks having different binding arrangements in embodiments of the invention.
Figure 6B:
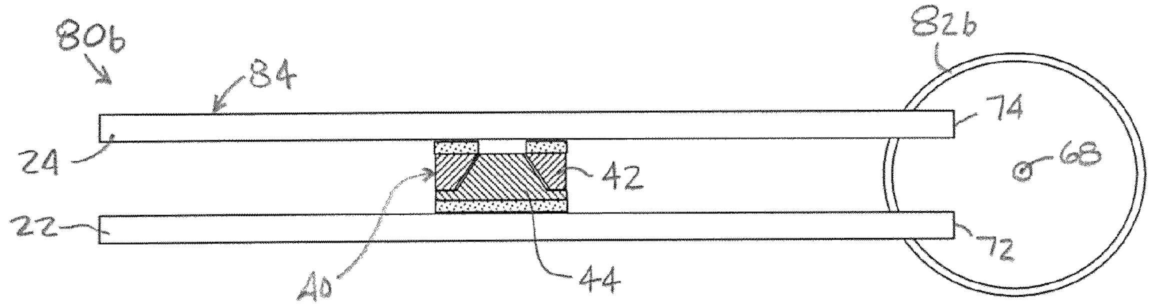
Figure 6C:
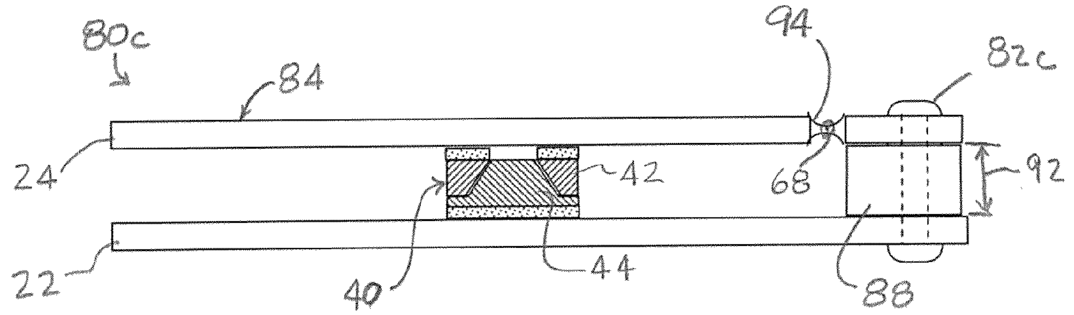

Referring to FIGS. 6A through 6C, various binding arrangements 80*a* through 80*c* for pivotally connecting the panels 22 and 24 about the binding axis 68 are depicted in embodiments of the invention. In one embodiment, the parallel edges 72 and 74 of the first and second panels 22 and 24 are bound with a binding 82 to form an embossing workbook 84. The binding 82 can be a flexible hinge 82*a* (FIG. 6A) of, for example, a book cover material such as coated cloth and can define a width 86. Another way to pivotally connect the panels 22 and 24 about the pivot axis 68 is with rings 82*b* (FIG. 6B). In another embodiment, the panels 22 and 24 are bound together with a post-type binding 82*c*, the panels 22 and 24 being separated by a spacer 88 having a thickness 92 to establish separation between panels 22 and 24 at the pivot axis 68 (FIG. 6C). In this embodiment, at least one of the panels 22 and 24 includes a hinged portion 94, such as a cloth hinge (depicted) or a piano hinge that is offset from the posts of the post-type binding 82*c*.

Functionally, the pivoting arrangements 80*a* through 80*c* enable the attachment surfaces 26, 28 of the panels 22 and 24 to be substantially parallel during the pressing operation. For example, the flexible hinge 82*a* and the spacer 88 are dimensioned so that, when the attachment surfaces 26, 28 are substantially parallel, the embossing mold pair 40 is fully engaged, regardless of the location on the attachment surfaces 26, 28 and regardless of whether more than one embossing mold pair 40 is utilized.

Figure 7A:
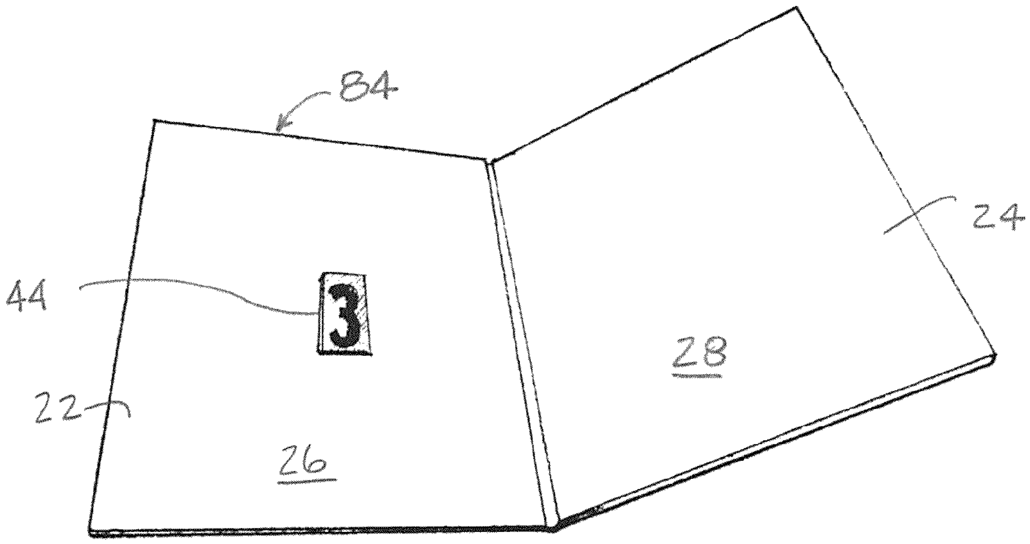
FIGS. 7A through 7H depict the operation of the stationery embossing system in an embodiment of the invention.

Referring to FIGS. 7A-7H, operation of the stationery embossing system 20 is depicted in an embodiment of the invention. In the depicted operation, the back face 58 of the male embossing mold 44 of the embossing mold pair 40 is coupled with the attachment surface 26 of the first panel 22, the front face 56 and raised portion 60 of the male embossing mold 44 facing upward or away from the first panel 22 (FIG. 7A). The attachment of the male embossing mold 44 can be made at an arbitrary location on the attachment face and in an arbitrary orientation.

Figure 7B:
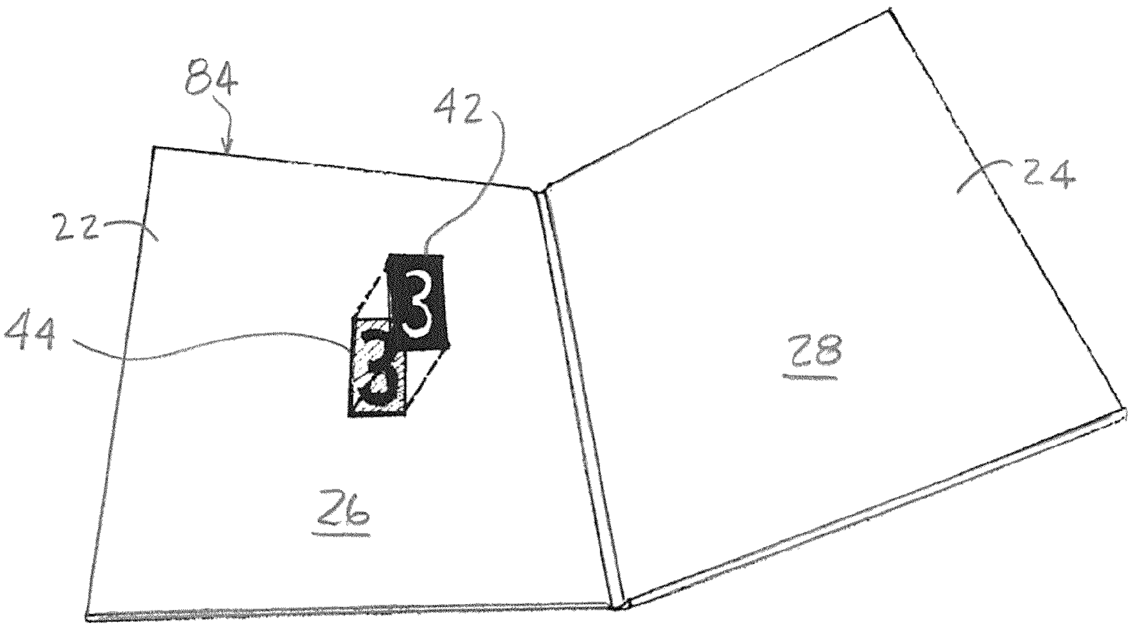

The female embossing mold 42 of the embossing mold pair 40 is then aligned with the male embossing mold 44 by placing the recess 52 of the front face 46 of the female embossing mold 42 onto the raised portion 60 of the front face 56 of the male embossing mold 44 (FIG. 7B). Because the male and female embossing molds 24 and 44 are complementary (i.e., the raised portion 60 of the male embossing mold 44 defines a three-dimensional solid that has the same shape and fits within a three-dimensional void defined by the recess 52 of the female embossing mold 42), placing the female embossing mold 42 over the male embossing mold 44 acts to align the male embossing mold 44 within the female embossing mold 42. In this configuration, the back face 48 of the female embossing mold 42 faces upward or away from the first panel 22.

Figure 7C:
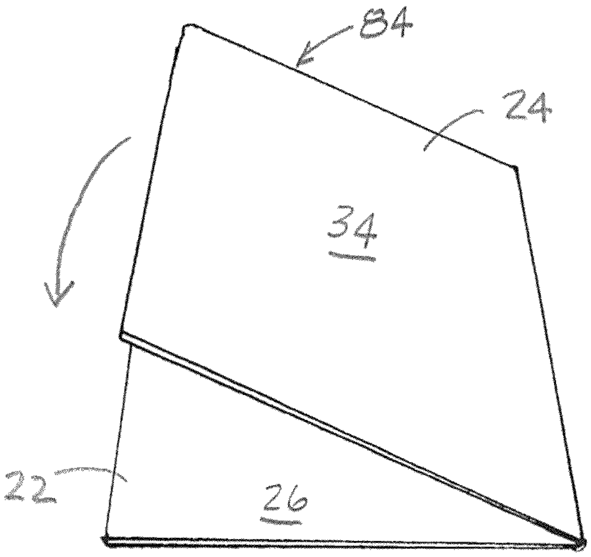
Figure 7D:
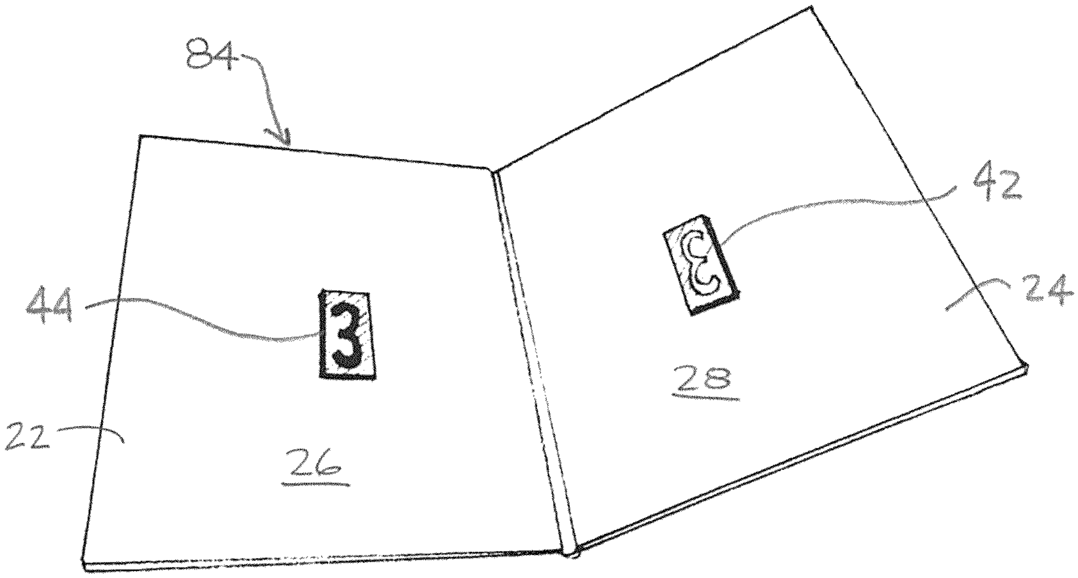

After the female embossing mold 42 is oriented over the male embossing mold 44, the second panel 24 is placed over the first panel 22 such that the attachment surface 28 of the second panel 24 is brought into connecting contact with the back face 48 of the female embossing mold 42 (FIG. 7C). The connecting contact causes the female embossing mold 42 to become attached to the attachment surface 28 of the second panel 24. The second panel 24 is then rotated away or otherwise separated from the first panel 22, thereby removing the female embossing mold 42 from the raised portion 60 of the front face 56 of the male embossing mold 42 (FIG. 7D). By this technique, the male and female embossing molds 44 and 42 are aligned for subsequent closures between the first and second panels 22 and 24.

Figure 7E:
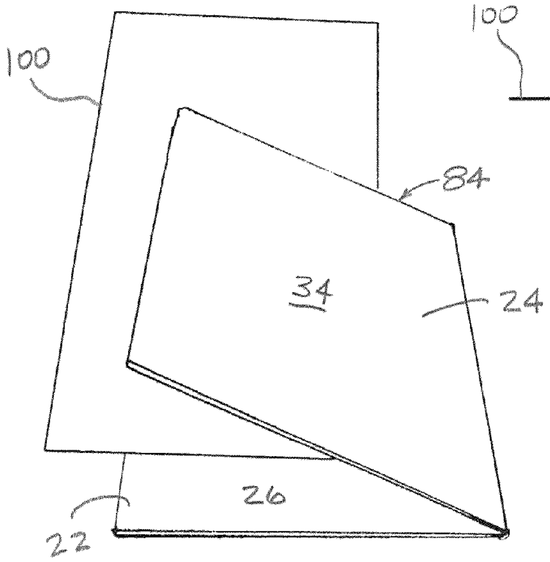
Figure 7F:
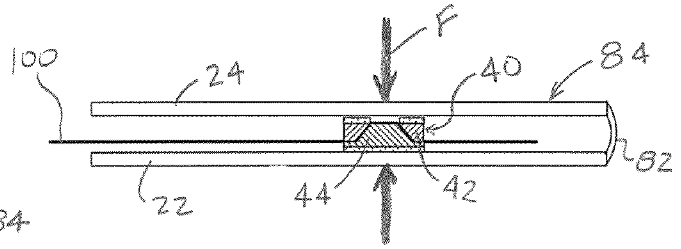

Having aligned the male and female embossing molds 44 and 42 on the opposing attachment surfaces 26 and 28 of the first and second panels 22 and 24, a thin sheet stock 100 to be embossed is inserted between the male and female embossing molds 42 and 44 (FIG. 7E). The thin sheet stock 100 can comprise, for example, paper, card stock, films/foils and laminated stock. The panels 22 and 24 are then brought back together as previously oriented during alignment of the male and female embossing molds 44 and 42 (FIG. 7F). The panels 22 and 24 are then pressed together with a pressing force F, causing the image of the embossed mold pair 40 to be embossed on the thin sheet stock 100.

It is noted that the order of the attachment of the embossing molds 42, 44 and the panel 22, 24 to which attachment is made is non-limiting. That is, instead of starting with the male embossing mold 44, one can first attach the female embossing mold 42 for subsequent alignment of the male embossing mold 44. Also, instead of first mounting the male embossing mold 44 or the female embossing mold 42 to the first panel 22, one can first mount the embossing mold 42 or 44 to the second panel 24.

Figure 7G:
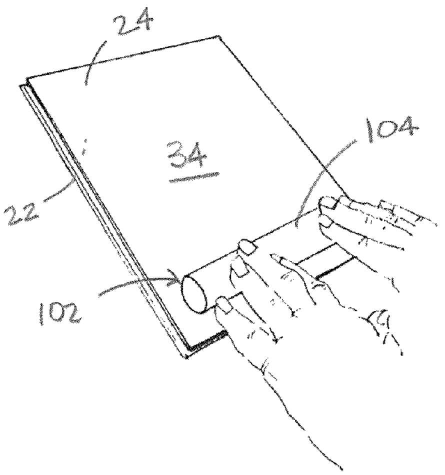
Figure 7H:
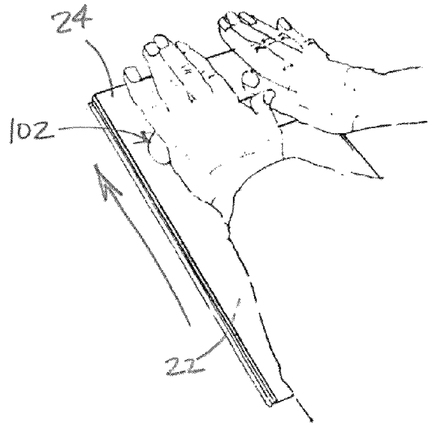

In one embodiment, a roller 102 can be provided and used to assist in pressing the panels 22 and 24 together (FIGS. 7G and 7H). The roller 102 can include a generally cylindrical portion 104, such as provided by, for example, a dowel or rolling pin. In operation, the embossing workbook 84 is placed on a firm, flat surface with the thin sheet stock 100 inserted within in the closed position, thus exposing the backside surface 32 or 34 of one of the panels 22 or 24. (Backside surface 34 is depicted as exposed in the depiction of FIGS. 7G and 7H.) The roller 102 is then rolled over the exposed backside surface 32 or 34 while applying a downward pressure. The roller 102 can be rolled back and forth over the exposed backside surface 32 or 34.

Figure 8:
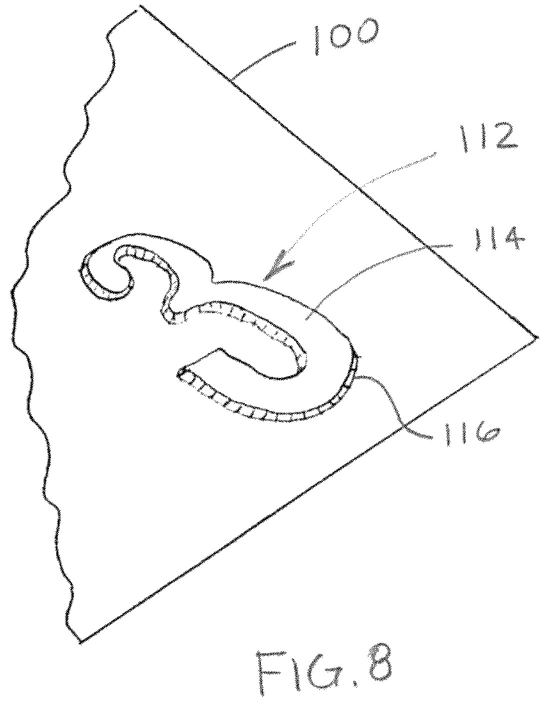
FIG. 8 is a partial view of an embossed article having an embossed image thereon in an embodiment of the invention.

Referring to FIG. 8, a representative embossed image 112 produced by the stationery embossing system 20 is depicted in an embodiment of the invention. The embossed image 112 includes a raised portion 114 that defines an outline 116 at the intersection of the flat sheet stock 100 and the raised portion 114.

Figure 9:
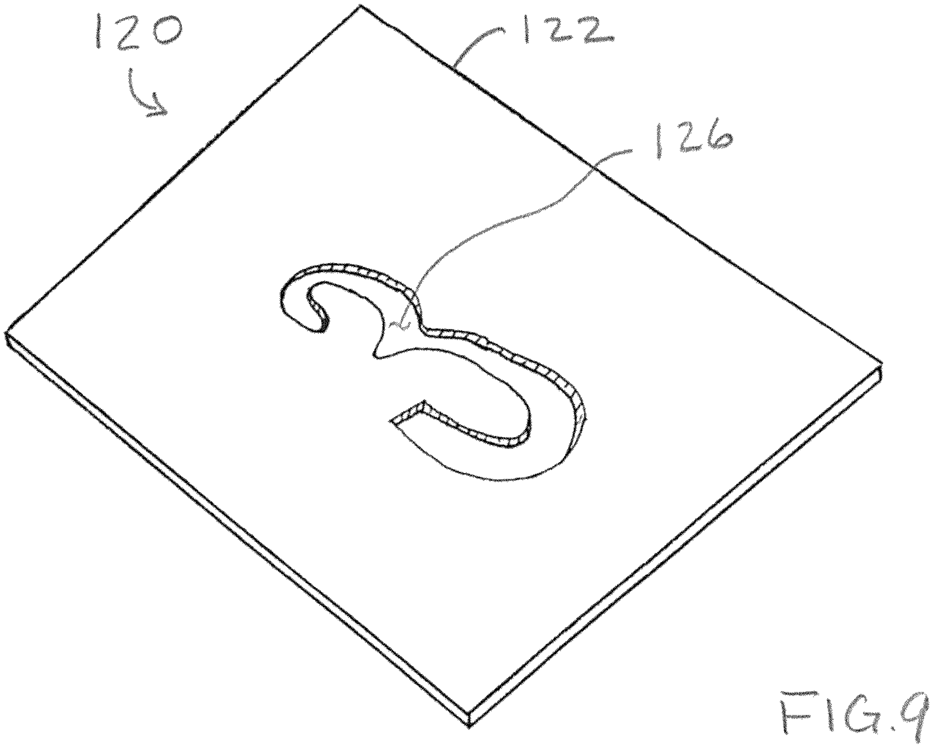
FIG. 9 is a perspective view of a coloring mask in an embodiment of the invention.

Referring to FIG. 9, a coloring mask 120 is provided in an embodiment of the invention. The coloring mask can comprise a thin card 122 fabricated from, for example, a polymer or a fluoropolymer (e.g., TEFLON). The coloring mask 120 includes an aperture 126 shaped to substantially coincide with the outline 116 of the raised portion 114 of the embossed image 112 embossed on the thin sheet stock 100.

Functionally, the coloring mask 120 can be used to assist the user in coloring the raised portion 114 of the embossed image 112. In operation, after the thin sheet stock 100 is embossed, the panels 22 and 24 are separated with the thin sheet stock 100 bearing embossed image 112 remaining coupled to the male embossing mold 44. The coloring mask 120 is then placed over and aligned with the embossed image 112. A coloring, such as ink or paint, can then be applied to the raised portion 114 of the embossed image 112 that protrudes into the aperture 126 of the coloring mask 120. The coloring mask 120 prevents the areas adjacent to the raised portion 114 of the embossed image 112 from being directly colored. The coloring mask 120 is then removed and can be cleaned for subsequent use.

The presence of the male embossing mold 44 during the coloring operation can help align the coloring mask 120, and to support the raised portion 114 of the embossed image 112 during the coloring operation. Alternatively, the coloring operation can be performed on the embossed image 112 after the thin sheet stock 100 is removed from the embossing workbook 84.

In one embodiment, the panels 22, 24 can be sized to accommodate a certain size thin sheet stock 100, for example a standard 8½×11 inch sheet size. The edges of the panels 22, 24 can be used to align the thin sheet stock 100 within the boundaries of the panels and between the panels. In other embodiments, the panels are undersized relative to the size of the thin sheet stock, thus providing an embossing tool that is clamped over an edge or corner of the thin sheet stock.

Referring to FIGS. 10A through 10D, configurations for various magnetic coupling configurations 130*a* through 130*d* (referred to collectively as magnetic coupling configurations 130) are depicted in embodiments of the invention. The magnetic coupling configurations 130 can utilize a combination of magnetized and magnetic materials to establish a magnetic attraction between the embossing molds 42, 44 and the attachment surfaces 26, 28. Herein, a “magnetized material” refers to a material that is made of a permanent magnetic material. A “magnetic material” is a material that is magnetically attracted to the magnetized material, but itself is not magnetic.

Figure 10A:
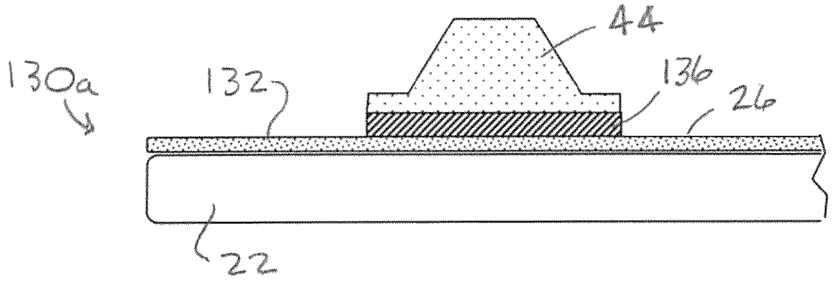
FIGS. 10A through 10D are partial sectional views of various magnetic coupling arrangements in embodiments of the invention.
Figure 10B:
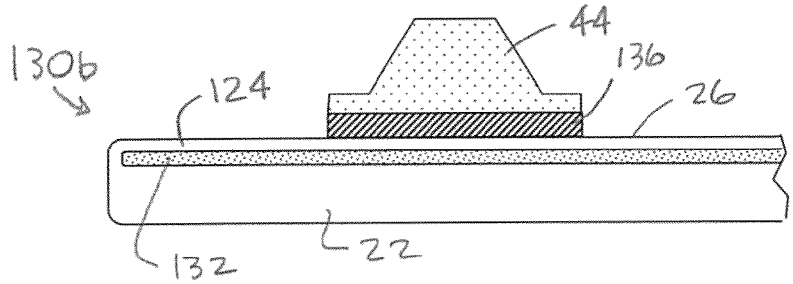
Figure 10C:
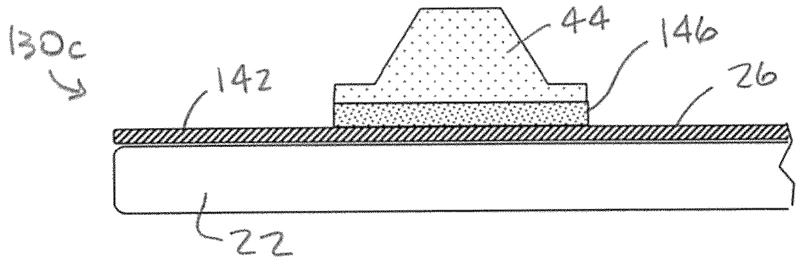

In one embodiment, a magnetized sheet 132 of material is disposed on the attachment face of one or both of the panels 22, 24 (FIG. 10A), so that the magnetized sheet 132 constitutes the attachment surface 26, 28 of the one or both panels 22, 24. In another embodiment, the magnetized sheet 132 is disposed beneath a cover material 124 such as a cloth fabric or coat of paint (FIG. 10B). For the embodiments of FIGS. 10A and 10B, the back faces 48 and 58 of the embossing molds 42 and 44 can be configured with a magnetic material 136. Alternatively, the back faces 48 and 58 of the embossing molds 42 and 44 can be configured with a magnetized material 138, so long as the magnetized materials 138 of the embossing molds 42, 44 and the magnetized sheet 132 are of suitable polarity so as not to repel each other or limit the orientation of the embossing molds 42 and 44.

Figure 10D:
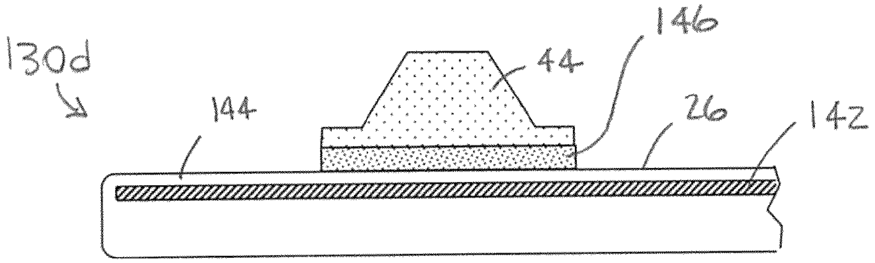

In other embodiments, a magnetic sheet 142 is disposed on the attachment face of one or both of the panels (FIG. 10C) so that the magnetic sheet 142 constitutes the attachment surface 26, 28 of the one or both panels 22, 24. The magnetic sheet 142 can comprise a solid sheet of magnetic material or a magnetic fabric. In one embodiment, the magnetic sheet 142 comprises a cloth material doped with magnetic material. In another embodiment, the magnetic sheet 142 is disposed beneath a cover material 144 such as a cloth fabric or coating of, e.g., paint, enamel or plastic (FIG. 10D). For the embodiments of FIGS. 10C and 10D, the back faces 48 and 58 of the embossing molds 42 and 44 are configured with a magnetized material 146.

Figure 11:
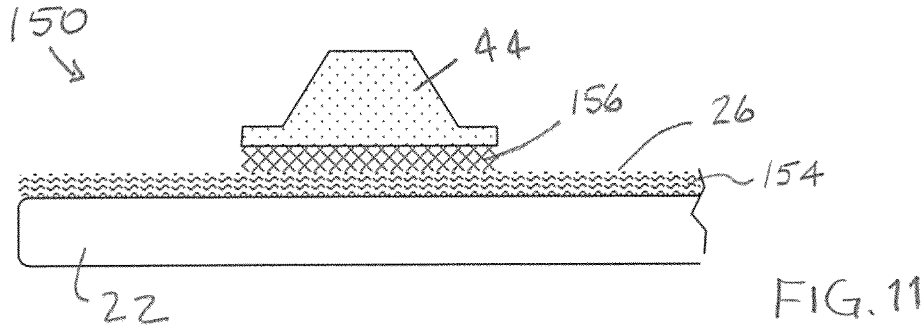
FIG. 11 is a partial sectional view of a hook-and-loop fastening arrangement in an embodiment of the invention.

Referring to FIG. 11, a hook-and-loop coupling arrangement 150 is depicted in an embodiment of the invention. In this embodiment, a loop fabric 154 is disposed on the panels 22 and 24 to establish the attachment faces 26 and 28. The back faces 48 and 58 of the embossing molds 42 and 44 are configured with a hook fabric 156 for coupling to the loop fabric 154 of the attachment surfaces 26, 28. Alternatively, the attachment surfaces 26, 28 can comprise the hook fabric 156 and the back faces 48 and 58 of the embossing molds 42, 44 comprise the loop fabric 154. The hook and loop arrangement 150 enables the embossing molds 42, 44 to be arranged on the attachment surfaces 26, 28 at arbitrary locations and in arbitrary orientations.

Figure 12:
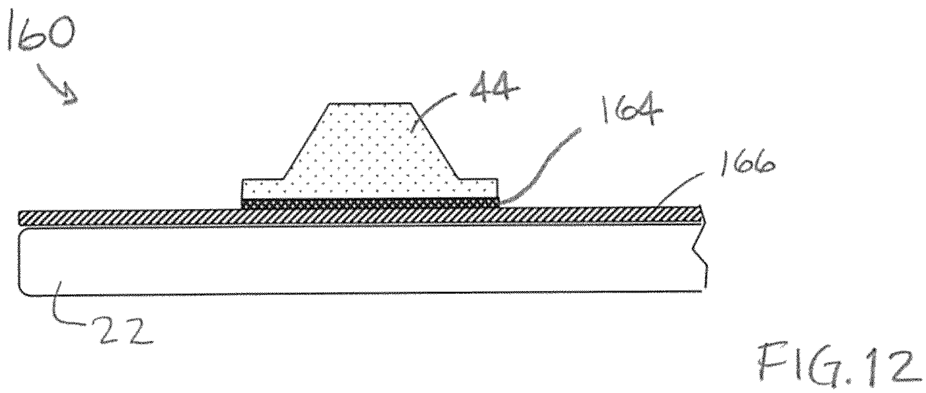
FIG. 12 is a partial sectional view of a re-adhereable coupling arrangement in an embodiment of the invention.

Referring to FIG. 12, a re-adhereable coupling arrangement 160 is depicted in an embodiment of the invention. In this embodiment, back faces 48, 58 of the embossing molds 42, 44 include a re-adhereable coating 164 such as polyvinyl chloride (PVC) vinyl or a re-adhereable adhesive. The attachment surfaces 26, 28 of the panels comprise a smooth, rigid surface 166 compatible for adherence with the re-adhereable coating 164, such as a painted metal, hard coat laminate, glass, polycarbonate or melamine. The re-adhereable coating 164 enables the embossing molds 42, 44 to be selectively and repeatedly attached to the attachment surfaces 26, 28. For packaging purposes, a barrier strip (not depicted) can be deposited over the back faces 48, 58 of the embossing molds 42, 44 during shipping, to be removed prior to use.

In one embodiment of the invention, the stationery embossing system 20 can be packaged as a kit. The kit can include the embossing workbook 84, a plurality of embossing mold pairs 80 defining different embossing shapes, a roller 102, and a plurality of coloring masks 120, one for each unique embossing mold pair 40. The kit can include instructions presented on a tangible medium, such as a document, compact disc (CD), or digital video disc (DVD).

While the above discussion and descriptions are directed to an embossing system, it is recognized that the various aspects of the invention can be directed to a recessing system as well. All of the features disclosed in this specification (including any accompanying claims, abstract and drawings), and/or all of the steps of any method or process so disclosed, can be combined in any combination, except combinations where at least some of such features and/or steps are mutually exclusive.

Each feature disclosed in this specification (including any accompanying claims, abstract and drawings) can be replaced by alternative features serving the same, equivalent or similar purpose, unless expressly stated otherwise. Thus, unless expressly stated otherwise, each feature disclosed is one example only of a generic series of equivalent or similar features.

For purposes of interpreting the claims for the present invention, it is expressly intended that the provisions of Section 112, sixth paragraph of 35 U.S.C. are not to be invoked unless the specific terms “means for” or “step for” are recited in the subject claim.

What is claimed is:

1. A stationery embossing/recessing system, comprising:

a first panel including a first attachment surface;

a second panel including a second attachment surface; and at least one embossing mold pair, said embossing mold pair including a female embossing mold and a male embossing mold, said female embossing mold having a front face and a back face and defining a recess relative to said front face, said back face of said female embossing mold being configured to adhere to said first attachment surface for coupling with said first attachment surface at an arbitrary location and in an arbitrary orientation thereon with infinite resolution, said male embossing mold having a front face and a back face, said front face of said male embossing mold including a raised portion that is complementary to said recess of said female embossing mold, said back face of said male embossing mold being configured to adhere to said second attachment surface for coupling with said second attachment surface of said second panel at an arbitrary location and in an arbitrary orientation thereon with infinite resolution;

wherein said first panel and said second panel are selectively configurable in an embossing position, said first panel being opposed and adjacent in said embossing position, said raised portion of said front face of said male embossing mold being mated within said recess of said female embossing mold when in said embossing position.

2. The stationery embossing system of claim 1, wherein said first panel includes a first edge portion and the second panel includes a second edge portion, said first edge portion being pivotally connected and substantially parallel to said second edge portion.

3. The stationery embossing system of claim 2, wherein said first edge portion and said second edge portion are pivotally connected with a flexible hinge.

4. The stationery embossing system of claim 1, wherein:

said first attachment surface comprises a magnetized sheet material and said back face of said female embossing mold includes one of a magnetized material and a magnetic material, said back face of said female embossing mold being magnetically attracted to said magnetized sheet material of said first attachment surface;

said second attachment surface comprises a magnetized sheet material and said back face of said male embossing mold includes one of a magnetized material and a magnetic material, said back face of said male embossing mold being magnetically attracted to said magnetized sheet material of said second attachment surface.

5. The stationery embossing system of claim 1, wherein:

said first panel comprises a magnetized sheet material disposed beneath said first attachment surface, and said back face of said female embossing mold includes one of a magnetized material and a magnetic material, said back face of said female embossing mold being magnetically attracted to said magnetized sheet material of said first panel for attachment to said first attachment surface;

said second panel comprises a magnetized sheet material and said back face of said male embossing mold includes one of a magnetized material and a magnetic material, said back face of said male embossing mold being magnetically attracted to said magnetized sheet material of said second panel for attachment to said second attachment surface.

6. The stationery embossing system of claim 5, wherein said first attachment surface comprises one of a paint layer, a woven cloth and a leather material.

7. The stationery embossing system of claim 1, wherein:

said first attachment surface comprises one of a magnetic sheet material and a magnetic material, and said back face of said female embossing mold includes a magnetized material, said back face of said female embossing mold being magnetically attracted to said first attachment surface;

said second attachment surface comprises one of a magnetic sheet material and a magnetic material, and said back face of said male embossing mold includes a magnetized material, said back face of said male embossing mold being magnetically attracted to said first attachment surface.

8. The stationery embossing system of claim 1, wherein:

said first panel comprises one of a magnetized sheet material and a magnetic material disposed beneath said first attachment surface, and said back face of said female embossing mold includes a magnetized material, said first panel being attracted to said back face of said female embossing mold for attachment of said female embossing mold to said first attachment surface;

said second panel comprises one of a magnetized sheet material and a magnetic material disposed beneath said second attachment surface, and said back face of said male embossing mold includes a magnetized material, said second panel being attracted to said back face of said male embossing mold for attachment of said male embossing mold to said second attachment surface.

9. The stationery embossing system of claim 8, wherein said first attachment surface comprises one of a paint layer, a woven cloth and a leather material.

10. The stationery embossing system of claim 1, further comprising a coloring mask having an aperture shaped to substantially coincide with an outline of said raised portion of said male embossing mold.

11. A stationery embossing system, comprising:

a first panel including a first attachment surface;

a second panel including a second attachment surface;

at least one embossing mold pair, said embossing mold pair including a female embossing mold and a male embossing mold;

means for attaching said female embossing mold to said first attachment surface at arbitrary locations and in arbitrary orientations thereon with infinite resolution; and means for attaching said male embossing mold to said second attachment surface at arbitrary locations and in arbitrary orientations thereon with infinite resolution.

12. The stationery embossing system of claim 11, further comprising:

means for pivotally connecting said first panel to said second panel.

13. The embossing system of claim 11, further comprising:

means for color masking an embossed image.

14. The stationery embossing system of claim 11, further comprising means for aligning said female embossing mold with said male embossing mold.

15. The stationery embossing system of claim 11, wherein means for attaching said female embossing mold to said first attachment surface at arbitrary locations and in arbitrary orientations with infinite resolution is a magnetic coupling arrangement, and means for attaching said male embossing mold to said second attachment surface at arbitrary locations and in arbitrary orientations with infinite resolution includes is a magnetic coupling arrangement.

* * * * *